(12) United States Patent
Kota et al.

(10) Patent No.: US 7,936,707 B2
(45) Date of Patent: May 3, 2011

(54) SATELLITE COMMUNICATION BANDWIDTH CROSS LAYER ALLOCATION SYSTEM AND RELATED METHODS

(75) Inventors: Sastri L. Kota, Sunnyvale, CA (US); David B. Bradley, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 853 days.

(21) Appl. No.: 11/924,958

(22) Filed: Oct. 26, 2007

(65) Prior Publication Data

US 2009/0109895 A1    Apr. 30, 2009

(51) Int. Cl.
    H04B 7/185    (2006.01)
    H04W 4/00    (2009.01)
    H04N 7/20    (2006.01)

(52) U.S. Cl. ....... 370/316; 370/332; 370/338; 455/12.1; 725/95

(58) Field of Classification Search .................. 370/310, 370/312–318, 326, 328–334, 338, 345–349; 455/3.01–3.05, 427–431, 7–25, 500–522; 725/95
See application file for complete search history.

(56) References Cited

U.S. PATENT DOCUMENTS

| | | | | |
|---|---|---|---|---|
| 6,377,561 | B1 | 4/2002 | Black et al. | 370/330 |
| 6,654,344 | B1 * | 11/2003 | Toporek et al. | 370/230 |
| 7,219,132 | B2 * | 5/2007 | Hreha et al. | 709/217 |
| 7,394,780 | B1 * | 7/2008 | Gregory et al. | 370/316 |
| 7,675,879 | B1 * | 3/2010 | Gregory et al. | 370/316 |
| 2005/0193226 | A1 | 9/2005 | Ahmed et al. | 714/4 |
| 2007/0116151 | A1 | 5/2007 | Thesling | 375/326 |
| 2007/0234385 | A1 * | 10/2007 | Bopardikar et al. | 725/38 |
| 2008/0298299 | A1 * | 12/2008 | Thesling | 370/316 |

FOREIGN PATENT DOCUMENTS

EP    2053760 A1 *    4/2009

OTHER PUBLICATIONS

Albiol et al., IP-friendly cross-layer optimization of DVB-S2/RCE, Proceedings 9th International Workshop on Signal Processing for Space Communications (SPSC), European Space Agency, 2006.
Celandroni et al., Adaptive-Cross Layer Bandwidth Allocation Policies in a Rain-Faded Satellite Environment, C.2.1 Network Architecture and Design, Mar. 2, 2004.
Kota et al., Cross-Layer Protocols for Satellite Communication Networks: Part I, International Journal of Satellite Communications and Networking, 2006.
Kota et al., Cross-Layer Protocols for Satellite Communication Networks: Part II, International Journal of Satellite Communications and Networking, 2006.

* cited by examiner

Primary Examiner — Tri H Phan
(74) Attorney, Agent, or Firm — Allen, Dyer, Doppelt, Milbrath & Gilchrist, P.A.

(57) ABSTRACT

A satellite communications system may include a satellite, a first ground based satellite transceiver, at least one second ground based satellite transceiver, and at least one ground based terminal coupled to the at least one second ground based satellite transceiver and classifying uplink data into different uplink data classifications, determining an uplink data rate, and determining a satellite signal path degradation. The satellite communications system may also include a gateway coupled to the first ground based satellite transceiver and communicating with the at least one ground based terminal via the satellite. The gateway may use cross layer protocol interfacing with the at least one ground based terminal for adaptively changing at least one transmission characteristic based upon the satellite signal path degradation. The satellite may allocate bandwidth based upon the uplink data classification and the uplink data rate.

25 Claims, 13 Drawing Sheets

US 7,936,707 B2

SATELLITE COMMUNICATION BANDWIDTH CROSS LAYER ALLOCATION SYSTEM AND RELATED METHODS

FIELD OF THE INVENTION

The present invention relates to the field of communications, and, more particularly, to a satellite communication system and associated methods.

BACKGROUND OF THE INVENTION

Over the last fifty years, digital communication between electronic devices has become prevalent in modern technology. As more electronic devices speak with each other, it has become desirable to develop a common language of communication, in other words, a communication protocol. The communication protocol comprises a set of standard rules regulating how a pair of electronic devices communicate with each other and includes functions commonly needed during communication.

A multilayer communication protocol, for example, the Transmission Control Protocol and the Internet Protocol (TCP/IP), may comprise a plurality of layers for managing the respective functions of the protocol. For example, in the TCP/IP, the layers comprise, from top to bottom, an application layer, a transport layer, a network/internet layer, a data link layer, and a physical layer. Each layer of the protocol may be responsible for a defined set of functions used in the protocol and may be further subdivided into sublayers, for example, the data link layer comprises a Media Access Control (MAC) layer.

In the multilayer communication protocol, each layer operates independently of the other layers. This regime of independence for each layer provides for modular design and maintenance. In other words, updates in the functions of one layer may not require propagation of changes into the other layers. Each layer may interact with an adjacent layer, the lower layer providing services to the upper layer. In this manner, a lower layer, for example, the physical layer, may directly communicate with an upper adjacent layer, for example, a data link layer. The physical layer may communicate with a non adjacent upper layer, for example, the application layer, only by communicating through the intervening layers.

Recently, the communications industry has integrated satellite communication links into the Internet, which runs on the multilayered TCP/IP. Communication satellites are an important element of communication networks and provide accessibility for locations lacking hardwired access to networks, for example, the Internet. A typical satellite communication link comprises a first ground terminal communicating with a second ground terminal via the satellite. The first ground terminal transmits a signal to the satellite (uplink-return link), which then rebroadcasts the signal to the second ground terminal (downlink-forward link) and vice versa. The satellite communication link comprises a natural broadcast medium, which gives it several advantages over terrestrial wired networks.

To enhance standardization of multimedia satellite communication, Digital Video Broadcast (DVB) standards were developed for satellite communication. For example, the DVB-S2 forward link standard is a second generation specification for satellite broadband applications, and the DVB-RCS standard is a return specification. The DVB-S2 standard utilizes recent developments in coding and modulation that approach the Shannon bound for channel capacity. According to the DVB-S2 standard, the coding and modulation may be applied in an adaptive manner for one-to-one links to provide mitigation against signal fading, for example, rain fade.

Although satellites may provide robust communication to areas inaccessible to traditional terrestrial communication, satellite communication may be subject to certain drawbacks. One possible drawback is that inclement weather may degrade the quality of the signal, for example, rain fade. Rain fade comprises absorption of a microwave radio frequency downlink or uplink signal by rain or snow, and may be problematic at frequencies above 11 GHz. As will be appreciated by those skilled in the art, satellites with a low look angle are particularly subject to rain fade and may be subject to degraded satellite communication even when the weather at a ground terminal receiving the satellite signal is favorable.

Several methods have been disclosed that involve some form of cross layer protocol approach for improving satellite communication signal quality. For example, Peng et al., "Cross-layer enhancements of TCP Split-Connections Over Satellite Links", Int'l J. Satellite Communication and Networking, 2006, volume 24, the entire contents of which are incorporated by reference herein, discloses a congestion control method for TCP selective acknowledgment split-connections applied to a satellite link between two protocols. The method provides a congestion notification from the MAC layer to the TCP layer in the protocol. Another cross layer method is disclosed by Chini et al. in the article "Dynamic Resource Allocation Based on a TCP-MAC Cross-layer Approach for Interactive Satellite Networks", Int'l J. Satellite Communication and Networking, 2006, volume 24, the entire contents of which are incorporated by reference herein. This method for resource allocation in the return channel of a DVB-RCS standard network is based upon the cross layer interaction between the TCP and MAC layers.

However, with the recent push to use the Internet for multimedia applications that require low error rate, low delay, low delay variation, and low jitter, there may be drawbacks to integrating satellite links into the Internet with this kind of traffic. In these applications, the first and second ground terminals may comprise a first and second plurality of ground terminals. Satellite uplink and downlink bandwidth is limited and is typically distributed to the first and second pluralities of ground terminals, some of which may be transmitting and receiving traffic with varying levels of desired quality of service (QoS). The occurrence of rain fade may cause more difficulty in distributing bandwidth since the satellite uplink and downlink bandwidth decreases. Signal degradation may be particularly problematic for satellite downlink bandwidth since downlink bandwidth is several times smaller than uplink bandwidth, which benefits from greater transmission power.

SUMMARY OF THE INVENTION

In view of the foregoing background, it is therefore an object of the present invention to provide a satellite communications system that allocates bandwidth efficiently among a plurality of ground based terminals.

This and other objects, features, and advantages in accordance with the present invention are provided by a satellite communications system comprising a satellite, a first ground based satellite transceiver, at least one second ground based satellite transceiver, and at least one ground based terminal coupled to the at least one second ground based satellite transceiver and classifying uplink data into different uplink data classifications, determining an uplink data rate, and determining a satellite signal path degradation. The satellite communications system may also comprise a gateway coupled to the first ground based satellite transceiver and communicating with the at least one ground based terminal via the satellite. The gateway may use cross layer protocol interfacing with the at least one ground based terminal for adaptively changing at least one transmission characteristic based upon the satellite signal path degradation. The satellite may allocate bandwidth based upon the uplink data classification and the uplink data rate. The satellite path signal degradation may be based upon rain fade.

In certain embodiments, the at least one ground based terminal may comprise a plurality thereof having different priorities, and the satellite may allocate bandwidth further based upon the different priorities of the plurality of ground based terminals. The gateway may change the at least one transmission characteristic and the satellite may allocate bandwidth further based upon a QoS of a given service. Advantageously, the satellite communications system may efficiently allocate bandwidth among the ground based terminals based upon respective QoS requirements and services.

Moreover, the different uplink data classifications may comprise at least two of a real time class, a variable rate real time class, a variable rate jitter tolerant class, and a jitter tolerant class. The at least one transmission characteristic may comprise at least one of data coding and data modulation. The gateway may adaptively change the at least one transmission characteristic based upon a time period for communication from the at least one ground based terminal to the gateway.

In some embodiments, the ground based terminal may use a physical layer of a communications protocol for determining the satellite path signal degradation. Moreover, the gateway may interface with the at least one ground based terminal using a MAC layer and the physical layer of the communication protocol. The at least one ground based terminal may selectively assign allocated bandwidth to the different uplink data classifications. Advantageously, the satellite communications system may efficiently allocate bandwidth based upon cross layer protocol interfacing.

Another aspect is directed to a method for operating a satellite communications system comprising a satellite, a first ground based satellite transceiver, at least one second ground based satellite transceiver, at least one ground based terminal coupled to the at least one second ground based satellite transceiver, and a gateway coupled to the first ground based satellite transceiver and communicating with the at least one ground based terminal via the satellite. The method may comprise operating the at least one ground based terminal for classifying uplink data into different uplink data classifications, determining an uplink data rate, and determining a satellite signal path degradation. The method may also include operating the gateway using cross layer protocol interfacing with the at least one ground based terminal for adaptively changing at least one transmission characteristic based upon the satellite signal path degradation, and operating the satellite for allocating bandwidth based upon the uplink data classification and the uplink data rate.

Another aspect is directed to a gateway for a satellite communications system comprising a satellite, a first ground based satellite transceiver, at least one second ground based satellite transceiver, and at least one ground based terminal coupled to the at least one second ground based satellite transceiver and classifying uplink data into different uplink data classifications, determining an uplink data rate, and determining a satellite signal path degradation. The gateway may be coupled to the first ground based satellite transceiver and may communicate with the at least one ground based terminal via the satellite. The gateway may comprise a gateway processor communicating with the at least one ground based terminal and using cross layer protocol interfacing therewith for adaptively changing at least one transmission characteristic based upon the satellite signal path degradation in cooperation with the satellite allocating bandwidth based upon the uplink data classification and the uplink data rate.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
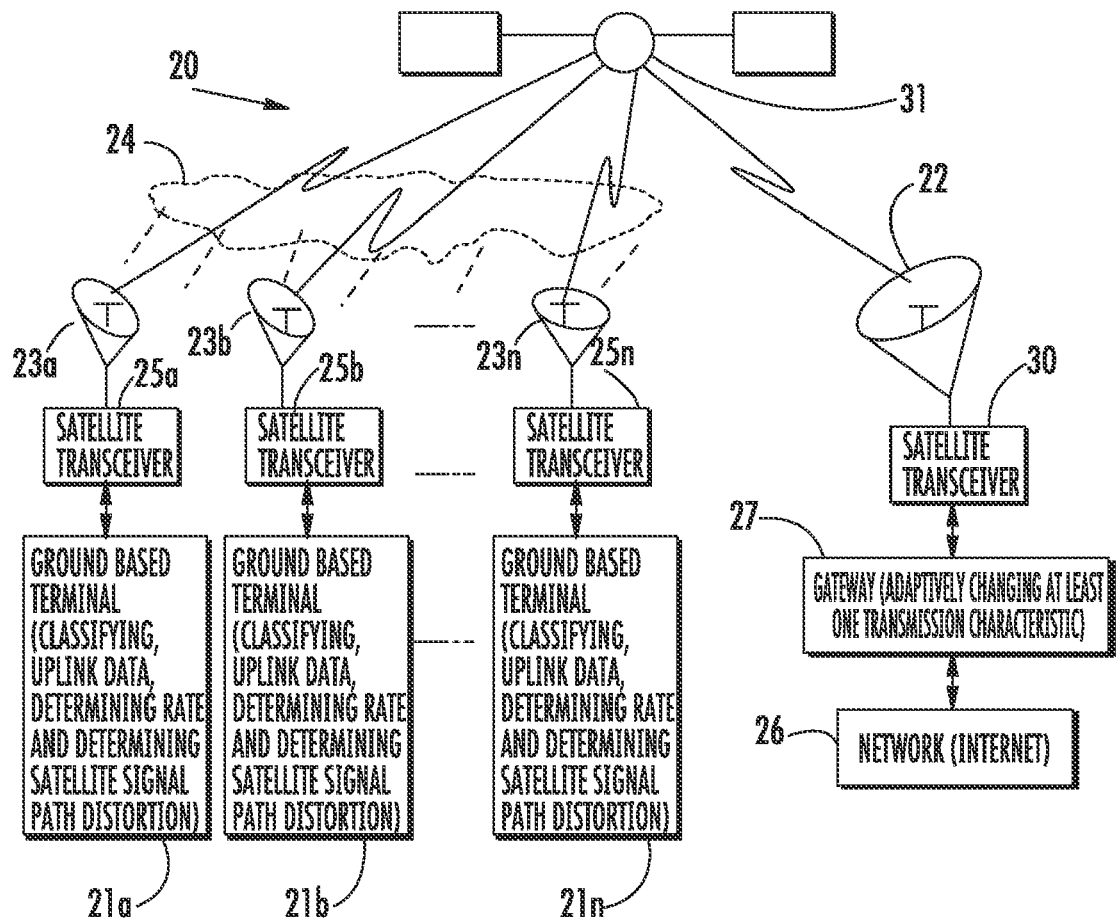
FIG. 1 is a schematic diagram of a satellite communication system of the present invention.

Referring initially to FIG. 1, a satellite communication system 20 is now described. The satellite communication system 20 transmits and receives data from a first network 26 to a ground based terminal 21a-n via a satellite 31. The satellite communications system 20 illustratively includes a satellite 31, a first ground based satellite transceiver 30, a plurality of second ground based satellite transceivers 25a-n, a plurality of ground based terminals 21a-n coupled to the second ground based satellite transceivers, and a gateway 27. The gateway 27 is illustratively coupled to the first ground based satellite transceiver 30 and communicates with the ground based terminals 21a-n via the satellite 31. The gateway 27 may comprise, for example, circuitry in the form of a processor, a memory coupled to the processor, and a plurality of network connections coupled to the first network 26 and the first ground based satellite transceiver 30. The first ground based satellite transceiver 30 is coupled to an antenna 22, and the respective second ground based satellite transceivers 25a-n are coupled to respective antennas 23a-n.

As will be appreciated by those skilled in the art, the gateway 27 may provide, for example, a network node for interfacing with another network that uses a different communication protocol. The gateway 27 may include, for example, circuitry to implement protocol translators, impedance matching devices, rate converters, fault isolators, and/or signal translators to provide system interoperability as will be appreciated by those skilled in the art. The gateway 27 may interconnect networks with different network protocol technologies by performing protocol conversions. For example, the gateway 27 may comprise a general purpose computer configured to perform the tasks of the gateway.

Each ground based terminal 21a-n may comprise, for example, a processor for executing applications, a memory coupled to the processor, and at least one network connection coupled to at least the respective ground based satellite transceiver 25a-n. As will be appreciated by those skilled in the art, each ground based terminal 21a-n may comprise a general purpose computer, a computer terminal, a receiving station, or a receiving station coupled to a second plurality of computer terminals, for example. Moreover, the satellite 31 may comprise, for example, an onboard processor for executing applications, a memory coupled to the onboard processor, and an antenna array for communicating with the ground based terminals 21a-n and the gateway 27.

The first network 26 also illustratively includes a first ground based satellite transceiver 30, and an antenna 22 coupled thereto. As will be appreciated by those skilled in the art, the first network may comprise, for example, the Internet, or a respective companion plurality ground based terminals (Not shown).

Each respective ground based terminal 21a-n generates uplink data for transmission to the first network 26 and generates data downlink requests from the first network. Each ground based terminal 21a-n classifies uplink data into different uplink data classifications. For example, the different uplink data classifications may comprise at least two of a real time class, a variable rate real time class, a variable rate jitter tolerant class, and a jitter tolerant class.

Moreover, each ground based terminal 21a-n monitors the local traffic environment and the signal quality of the received transmission from the satellite 31. For example, the ground based terminals 21a-n may determine a downlink data rate, i.e. packet arrival rate, an uplink data rate, and may determine a satellite signal path degradation. The satellite path signal degradation is illustratively based upon rain fade from snow or rain 24. But as will be appreciated by those skilled in the art, the satellite path signal degradation may be generated from other sources, for example, interference.

The ground based terminals 21a-n send the information relating to local traffic environment and satellite signal path degradation to the gateway 27 by way of the satellite 31 and send requests for uplink/downlink bandwidth to the satellite 31. Requests for bandwidth by the ground based terminals 21a-n may, for example, use a Bandwidth on Demand (BoD) scheme. In certain embodiments, the BoD scheme may involve operations at the ground based terminals 21a-n and at the satellite 31.

As will be appreciated by those skilled in the art, the packet data between the gateway 27 and/or ground based terminals 21a-n and the satellite 31 may be organized in frames, each frame having a duration of approximately 28 milliseconds, for example. The propagation time from a ground based terminal 21a-n to the satellite 31 and vice-versa is typically approximately 125 milliseconds. Thus, the propagation delay spans approximately 4.464 frames. Rounded up to the nearest frame, this delay equates to 5 frames, each frame having 128 data slots.

The sequence of operations for a ground based terminal 21a-n requesting bandwidth comprises a first ground based terminal 21a making a request at frame n for dynamically allocated uplink data slots based on conditions at the first ground based terminal. The conditions at the first ground based terminal 21a may comprise, for example, sizes of classification data queues, and the number of packet arrivals during frame n−1. At frame n+5 (at the first ground based terminal 21a), the satellite 31 receives the request as well as requests from all other ground based terminals 21b-n. On the basis of the request information and stored information including a constant rate allocation for each ground based terminal 21a-n, the satellite 31 makes a bulk allocation of uplink data slots for each ground based terminal and "broadcasts" the allocations to all the ground based terminals.

During downlink frame n+9 (at the first ground based terminal 21a), the first ground based terminal receives a bulk allocation, including the constant rate allocation, to be used on its next uplink frame. The first ground based terminal 21a assigns the bulk allocation among its classes of traffic based on its constant rate allocation and on the queue sizes at frame (n+9) using a class weighted algorithm for the dynamically allocated portion. The assigned allocation is then used on its next uplink frame (n+10).

As will be appreciated by those skilled in the art, the satellite communication system 20 uses a multilayer communication protocol comprising a plurality of layers for managing the respective functions of the protocol. The layers comprising at least a physical layer, a MAC layer, and an IP layer. In some embodiments, each ground based terminal 21a-n uses the physical layer for determining the satellite path signal degradation.

The gateway 27 uses cross layer protocol interfacing with the ground based terminals 21a-n for adaptively changing at least one transmission characteristic based upon the satellite signal path degradation. The satellite 31 allocates bandwidth based upon the uplink data classification and the uplink data rate. The at least one transmission characteristic may comprise at least one of data coding, and data modulation. The gateway 27 interfaces with the MAC layer for resource allocation, for example, changing coding, and modulation. As will be appreciated by those skilled in the art, the transmission characteristic may comprise any transmission characteristic that selectively changes the transmission capabilities, for example, transmission power.

In certain embodiments, the satellite communications system 20 may also prioritize each ground based terminal 21a-n and assign each a priority ranking. Moreover, the satellite 31 may allocate bandwidth further based upon the different priorities of the ground based terminals 21a-n. Additionally, the satellite communication system 20 may be operable with a given service from among a plurality thereof, each having a different QoS. In other words, the ground based terminals 21*a-n* may each execute a plurality of different applications, which may create bandwidth transmission requests for communications with the first network 26. The gateway 27 changes the at least one transmission characteristic and the satellite 31 allocates bandwidth further based upon the QoS of the given service. The gateway 27 and the satellite 31 may both interface with the IP layer to determine the respective QoS requirements for certain services.

Upon receipt of the allocated bandwidth from the satellite 31, each respective ground based terminal 21*a-n* may selectively assign allocated bandwidth to the different uplink data classifications in a weighted manner. For example, each ground based terminal 21*a-n* may have four class queues (0-3) and assign its bandwidth allocation to its four class queues. The constant bit rate allocation is made first to class queue 0 based solely on the value computed at initialization time. The remainder of the bulk allocation is made sequentially to class queues 1, 2 and 3 as follows:

```
Initialization:
    total_avail = bulk_alloc – CRA;
    score[i] = queue_length[i]*class_weight[i],
    i=1..3;
    total_score = sum(score[i]), i=1..3;
    total_length = sum(queue_length[i]), i=1..3;
for(i = 1; i < 4; i++)
{
    if(total_avail >= total_length) then alloc =
    queue_length[i];
    else alloc = total_avail*score[i]/total_score;
    total_avail –= alloc;
    total_length –= queue_length[i];
}
```

Each ground based terminal 21*a-n* may also assign allocated bandwidth from the satellite 31 using constant rate allocation, rate based dynamic capacity, volume based dynamic capacity, and free allocation. Advantageously, the satellite communications system 20 may efficiently allocate bandwidth based upon cross layer protocol interfacing.

Moreover, the satellite 31 may allocate bandwidth to the ground based terminals 21*a-n* independently. For example, depending on at least one of the uplink data classification, the uplink data rate, the satellite signal path degradation, the respective ground based terminal priority, and the services operating at the respective ground based terminal, the satellite 27 may allocate bandwidth dynamically to the first ground based terminal 21*a* and may also allocate static bandwidth to a second ground based terminal 21*b*. The static allocation of bandwidth for the second ground based terminal 21*b* is based upon services operating at the second ground based terminal at initialization. Advantageously, the second ground based terminal 21*b*, which may transmit and receive constant bit rate traffic, may be allocated static bandwidth from the satellite 31 and not absorb unnecessary allocation resources.

Additionally, the gateway 27 may adaptively change the at least one transmission characteristic on a frame-by-frame basis. More specifically, the gateway 27 may change the at least one transmission characteristic at a rate set by the time period needed for a transmission to propagate from the ground based terminal 21*a-n* through the satellite 31 to the gateway 27.

Figure 4:
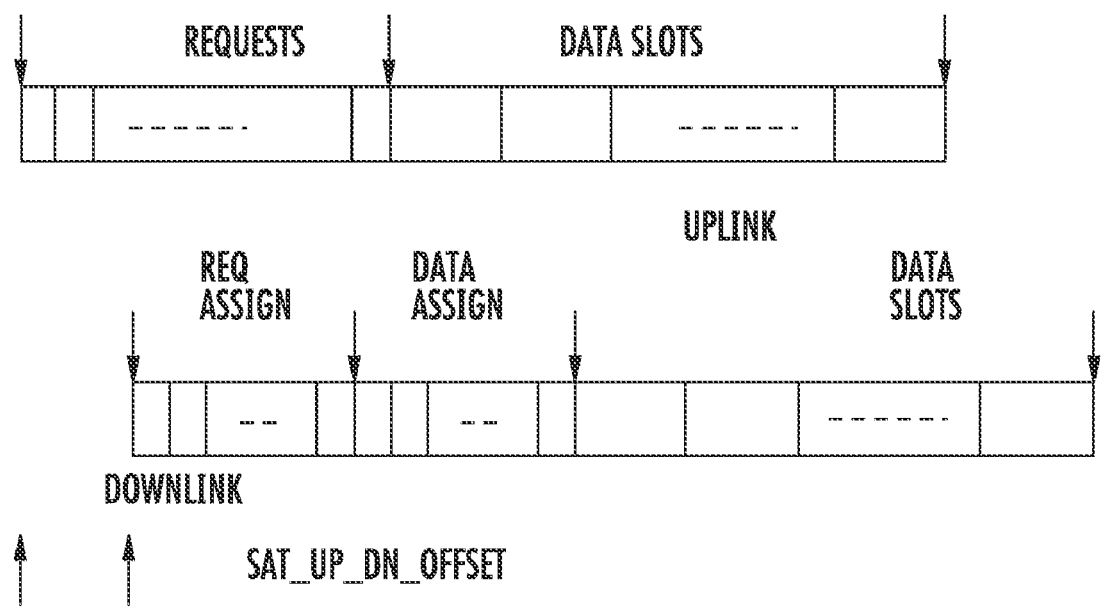
FIG. 4 is a diagram of the framing structure used by the satellite communications system as shown in FIG. 1.

Referring additionally to FIG. 4, a framing structure used by the satellite communications system 20 is described. This framing structure is disclosed in Paul D. Mitchell et al., "Burst Targeted Demand Assignment Multiple-Access for Broadband Internet Service Delivery Over Geostationary Satellite," IEEE Journal on Selected Areas In Communications, Vol. 22, No. 3, pp 546-558, April 2004, the entire contents of which are incorporated by reference herein. The framing structure is used for both uplink and downlink communication in the satellite communications system 20. The framing structure comprises the following parameters: basic bit rate 2048000 (scaled by power of 2); number of request slots 150; number of data slots 128; downlink request slot bits 20; uplink request slot bits 47; data slot assign bits 32; and basic data slot bits 424 (scaled by power of 2).

Figure 2:
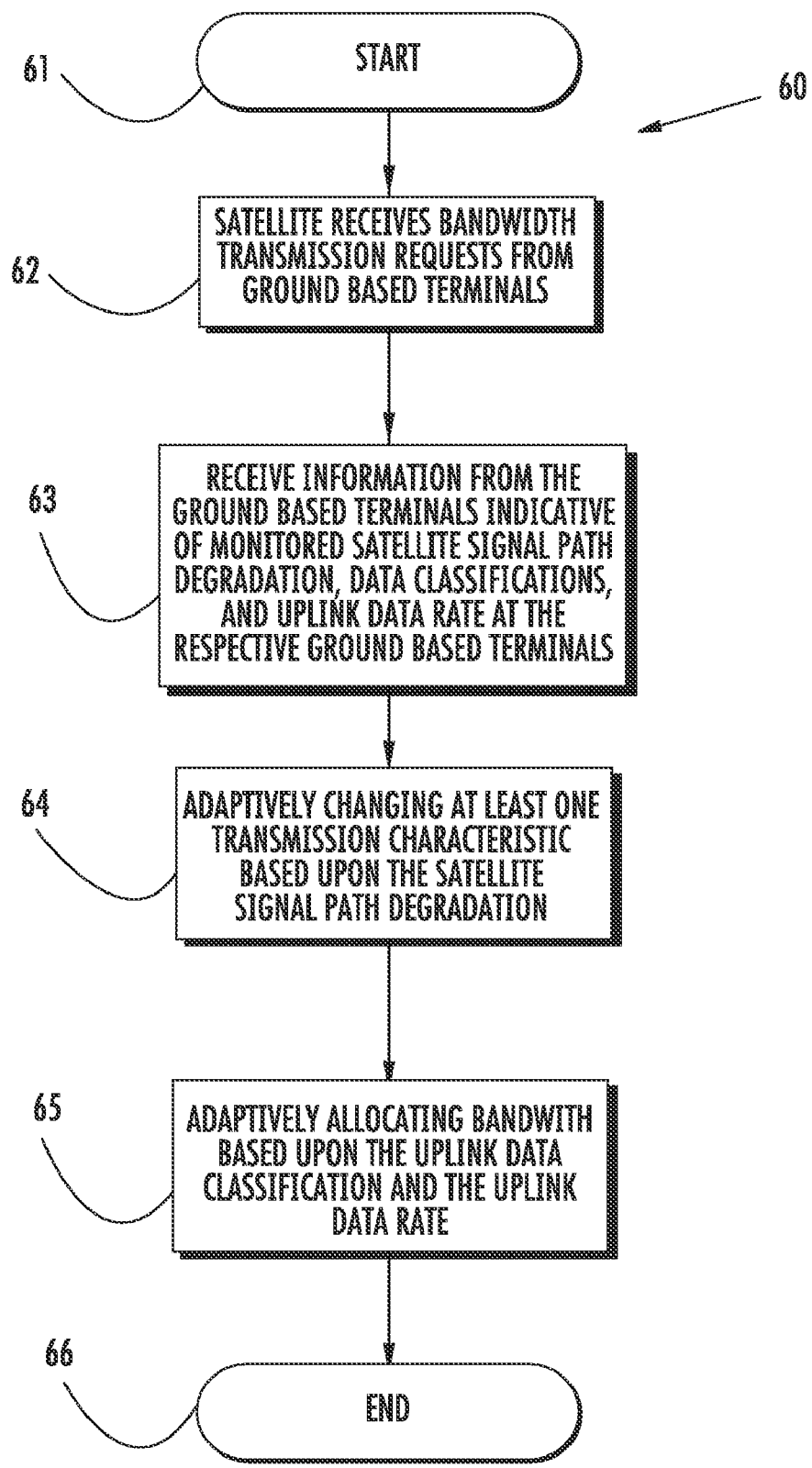
FIG. 2 is a flowchart of the operation of a gateway and a satellite of the satellite communication system as shown in FIG. 1.
Figure 3:
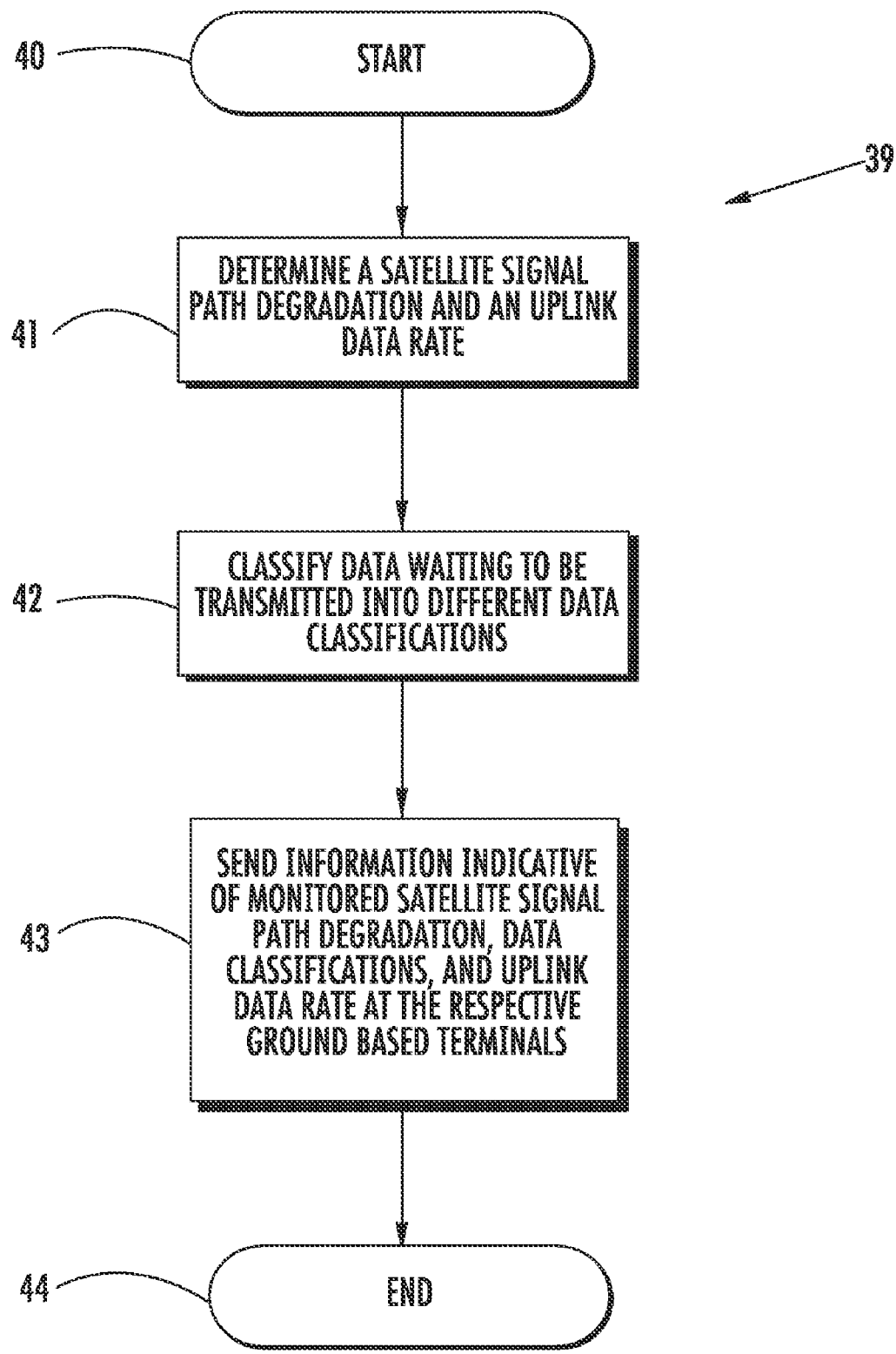
FIG. 3 is a flowchart of the operation of a ground based terminal of the satellite communication system as shown in FIG. 1.

Referring additionally to FIGS. 2-3, a method for operating the satellite communications system 20 is described. FIG. 2 includes a flowchart 60 illustrating the operation of the gateway 27 and the satellite 31, and FIG. 3 includes a flowchart 39 illustrating the operation of the ground based terminals 21*a-n*. The method illustratively includes starts (Block 40) by operating the at least one ground based terminal 21*a-n* for classifying uplink data into different uplink data classifications (Block 42), for determining a uplink data rate (Block 41), and for determining a satellite signal path degradation (Block 41). The ground based terminals 21*a-n* send information (Block 43) to the gateway 27 and satellite 31 indicative of monitored satellite signal path degradation, uplink data classifications, and uplink data rate at the respective ground based terminals.

The method illustratively continues (Block 61) upon receiving bandwidth transmission requests (Block 62) at the satellite 31, the method illustratively includes receiving information (Block 63) from the ground based terminals 21*a-n* indicative of monitored satellite signal path degradation, uplink data classifications, and uplink data rate at the respective ground based terminals. The method also illustratively includes operating the gateway 27 using cross layer protocol interfacing with the at least one ground based terminal for adaptively changing (Block 64) at least one transmission characteristic based upon the satellite signal path degradation. The method also includes operating the satellite for allocating bandwidth (Block 65) based upon the uplink data classification and the uplink data rate (Blocks 66, 44).

Referring now additionally to FIGS. 5-12, Applicants have simulated the satellite communications system 20 using an OPNET® Modeler Simulation Tool. A simulation network 50 is now described. The simulation network 50 is adapted from OPNET®'s IP QoS demonstration network, which is implemented for QoS investigation at the IP layer and has extensive statistics gathering probes for all the application traffic. The simulation assumes a multi-beam satellite. A first subnet 51, shown on the left of FIG. 5, comprises a gateway 55, a switch 54, and four servers 56*a-d*. This first subnet 51 represents the Internet, for example. The gateway 55 also serves as a ground terminal.

Figure 5:
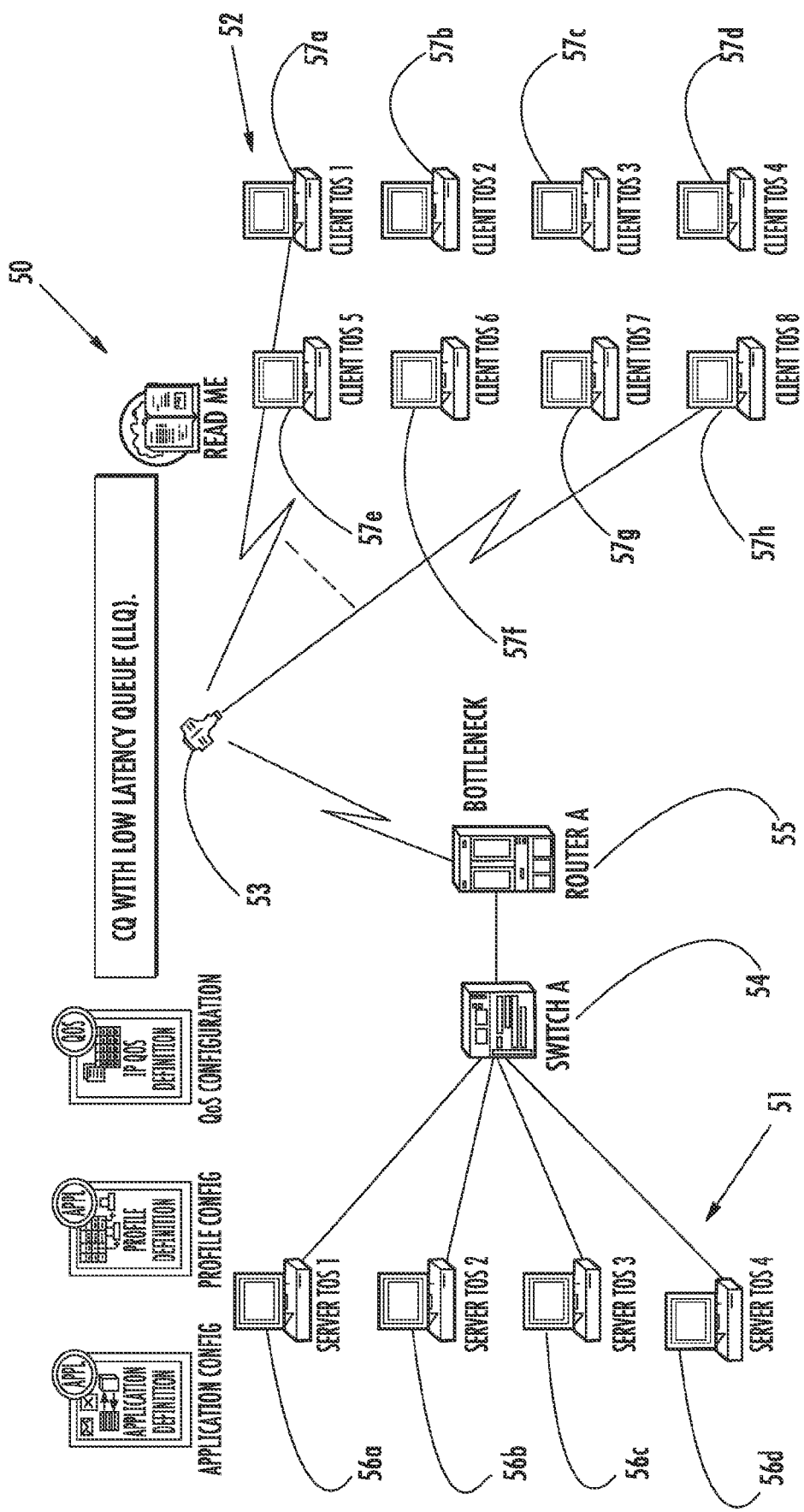
FIG. 5 is a schematic diagram of a network used to model the satellite communication system of the present invention.

The satellite 53 represents the bandwidth bottleneck of the simulation network 50. The clients 57*a-h* in a second subnet 52 request services from the servers 56*a-d*. These communications are conveyed by way of the reverse direction traffic. The Application Config and Profile Config objects in the upper left corner of FIG. 5 are used to setup applications and group them for use by the clients 57*a-h*. The QoS Config object configures QoS at the IP layer. In this simulation, the focus was the QoS on the satellite link, so that object was unused. Since the OPNET® Modeler does not provide time division demand assigned multiple access as a standard module, a custom ground terminal MAC and a custom satellite MAC were developed. During the simulation, a 10 dB rain fade event occurs during the simulation on the downlink for all clients with the following characteristics: start time 140 sec; attack rate 0.25 dB/s; attack duration 40 sec; recovery start time 180 sec; recovery rate 0.125 dB/s; and end of rain fade 260 sec.

Figure 6:
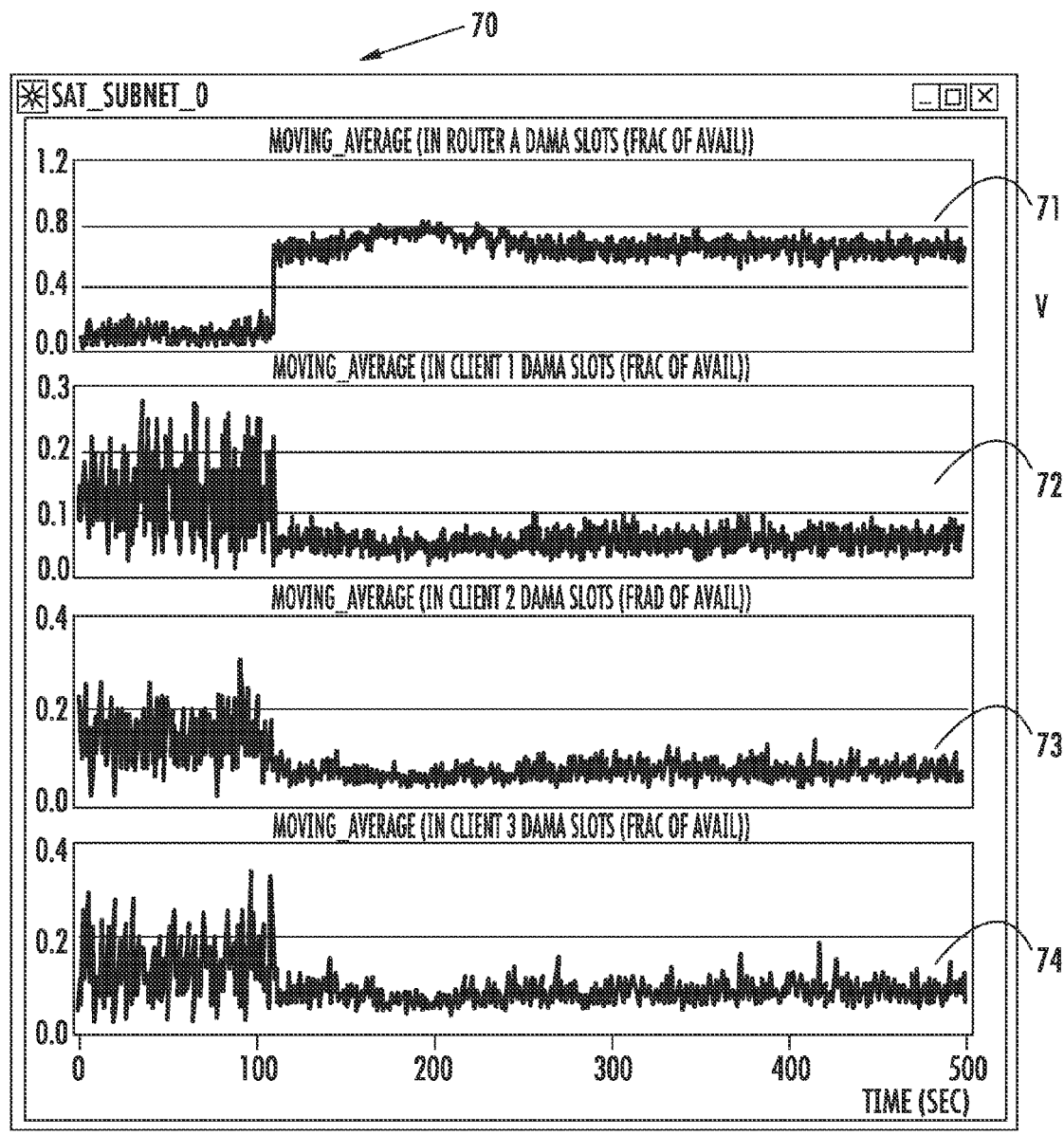
FIG. 6 is a graph of the allocation of data slots as a function of time for a simulation of traffic over the network shown in FIG. 5.
Figure 7:
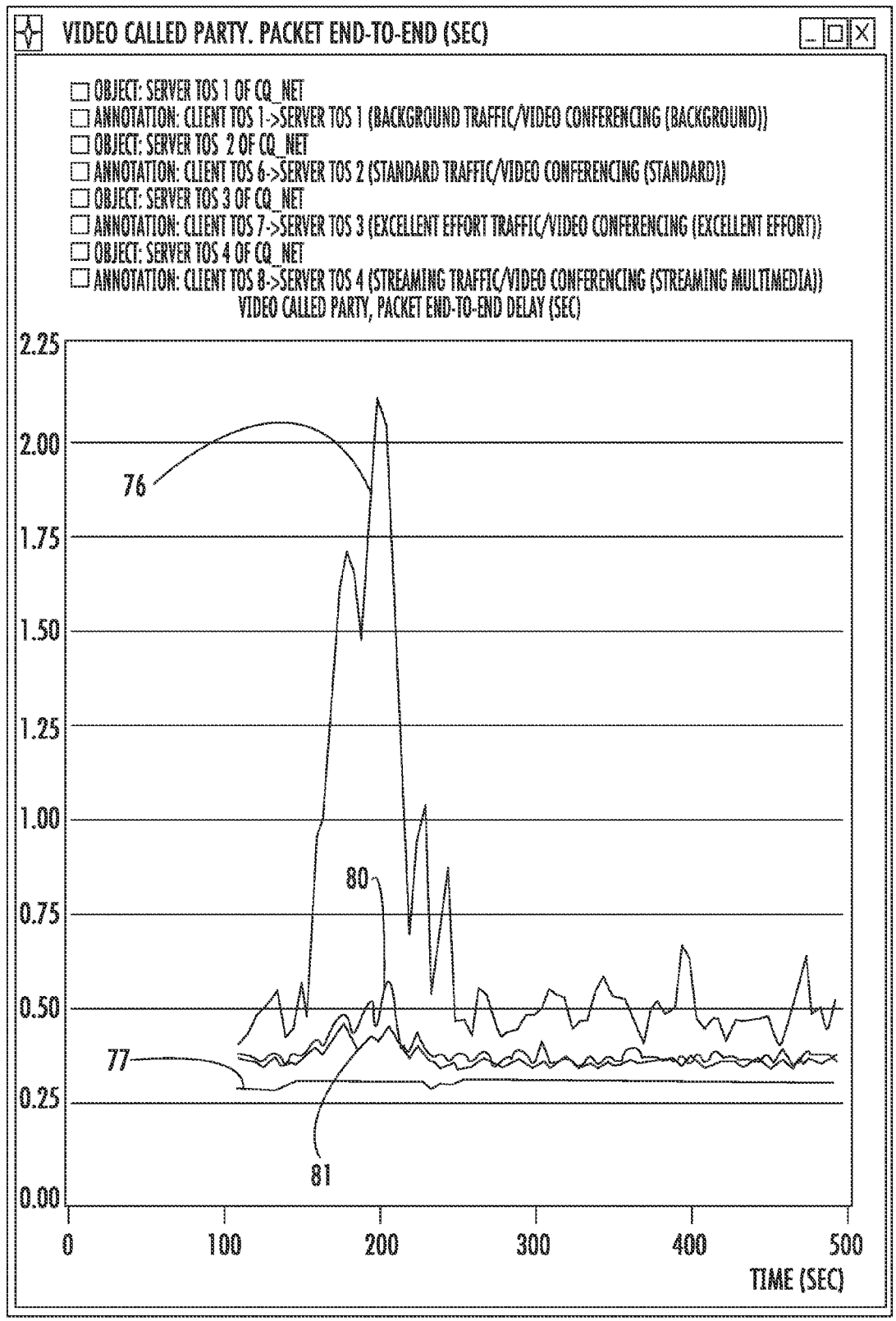
FIG. 7 is a graph of end-to-end delay for reverse direction video conferencing traffic for the simulation of traffic over the network shown in FIG. 5.
Figure 8:
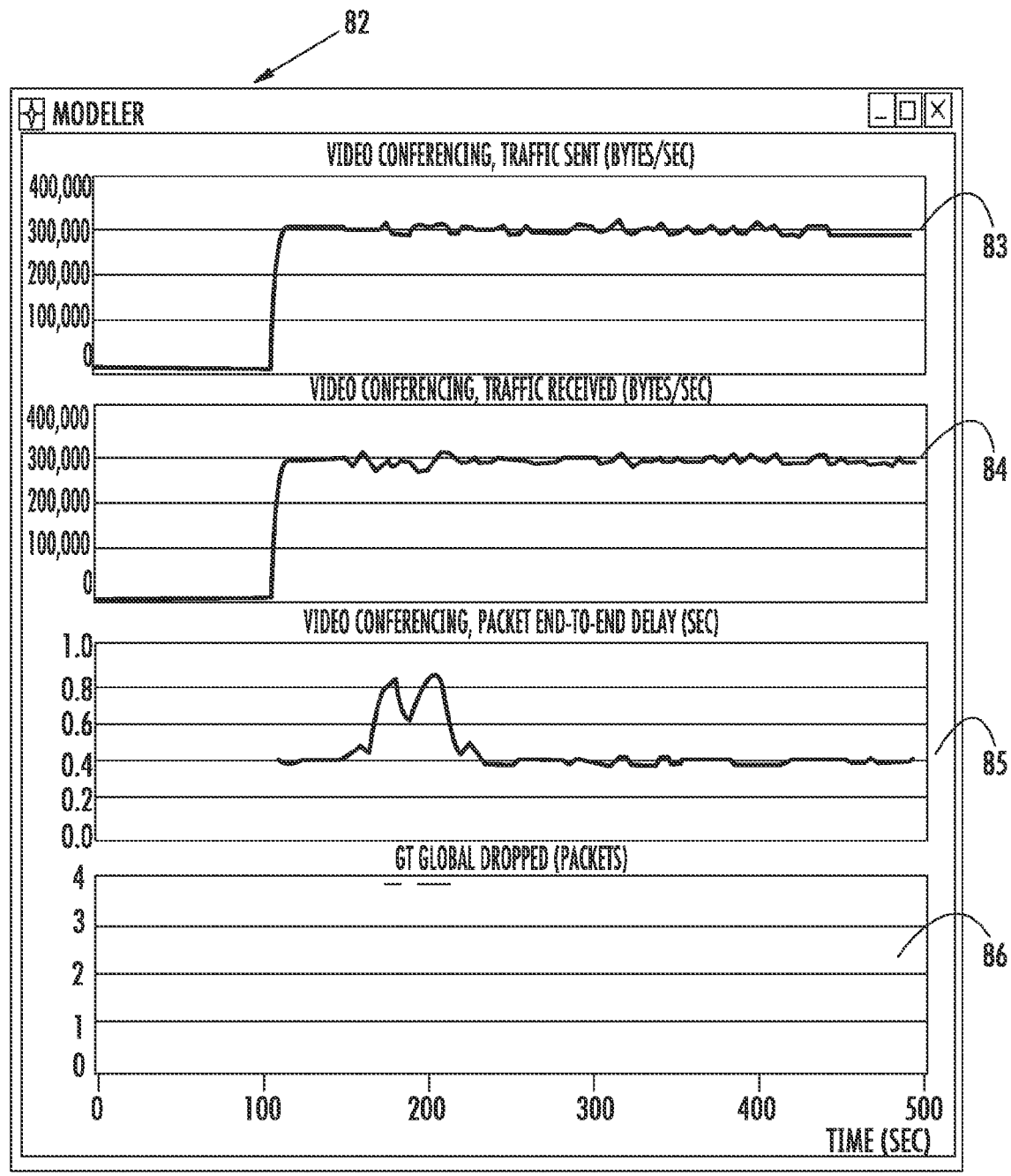
FIG. 8 is a graph of aggregate video conferencing traffic sent and received, end-to-end delay, and dropped packets for a simulation of traffic over the network shown in FIG. 5.

FIG. 6 includes a graph 70 illustrating the allocation of data slots at different points in the simulation network 50 (FIG. 5) as a function of simulation run time. The graph 70 includes a plot 71 for data slot allocation at the gateway 55, and plots 72-74 for data slot allocation at respective clients 57a-c. FIG. 7 includes a graph 75 illustrating end-to-end delay for reverse direction video conferencing traffic from clients 57a-d measured at servers 56a-d (plots 76, 80, 81, 77, respectively) as a function of simulation run time. This shows the higher delay and variability of the traffic passing through the lower class queues. Also, when there is congestion, the lower priority traffic suffers more than the higher priority traffic. FIG. 8 includes a graph 82 illustrating plots for aggregate video conferencing traffic sent 83 and received 84, end-to-end delay 85, and dropped packets 86 as a function of simulation run time. There were a total of 287 dropped packs during the rain fade. Of these, 165 occurred at the gateway 55 class 3 queue and 122 at client 57a class 3 queue. During the rain fade, the aggregate peak delay reached approximately 0.859 seconds. At other times it remained at about 0.4 seconds.

Figure 9:
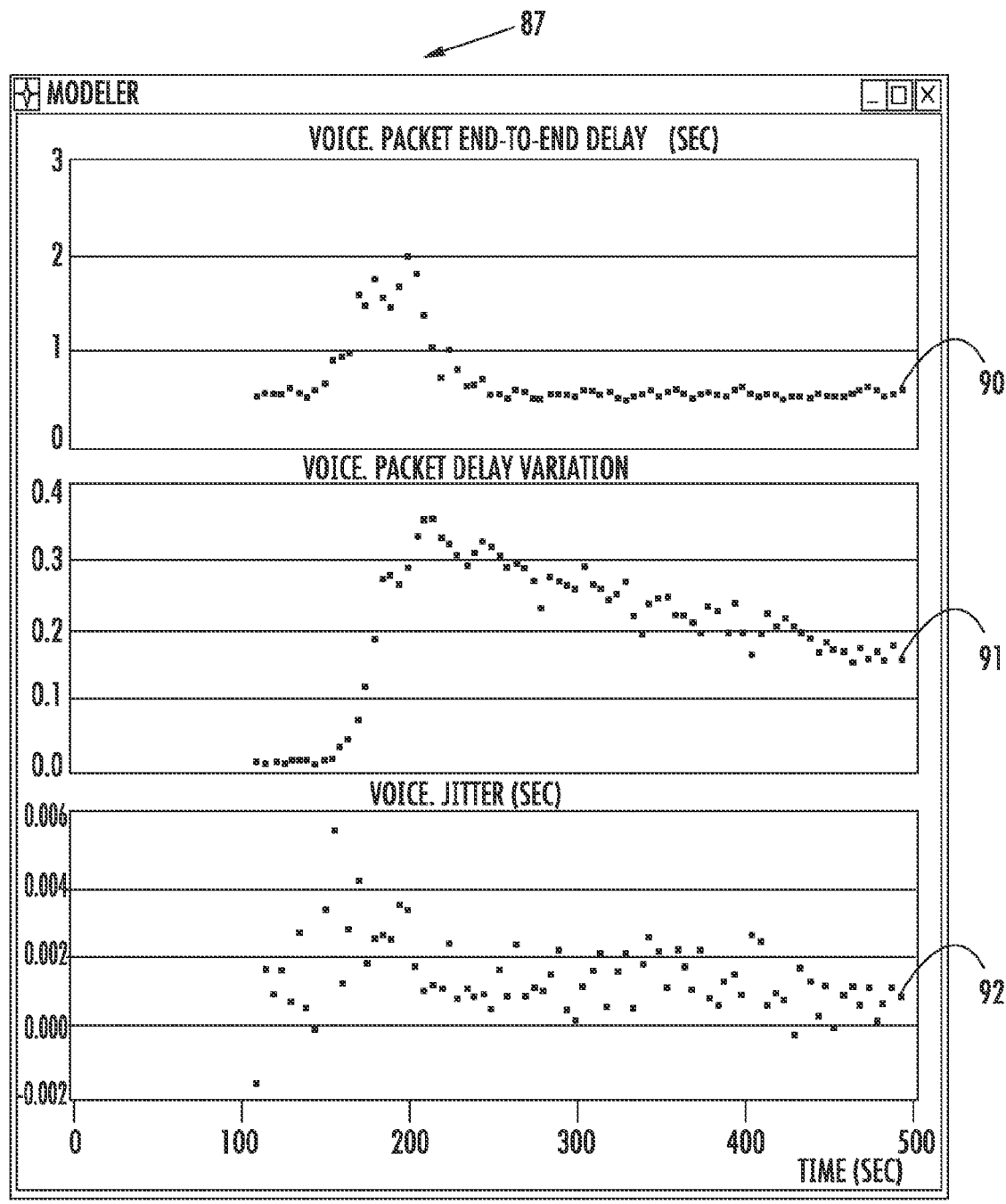
FIG. 9 is a graph of aggregate voice packet end-to-end delay, packet delay variation, and jitter for a simulation of traffic over the network shown in FIG. 5.
Figure 10:
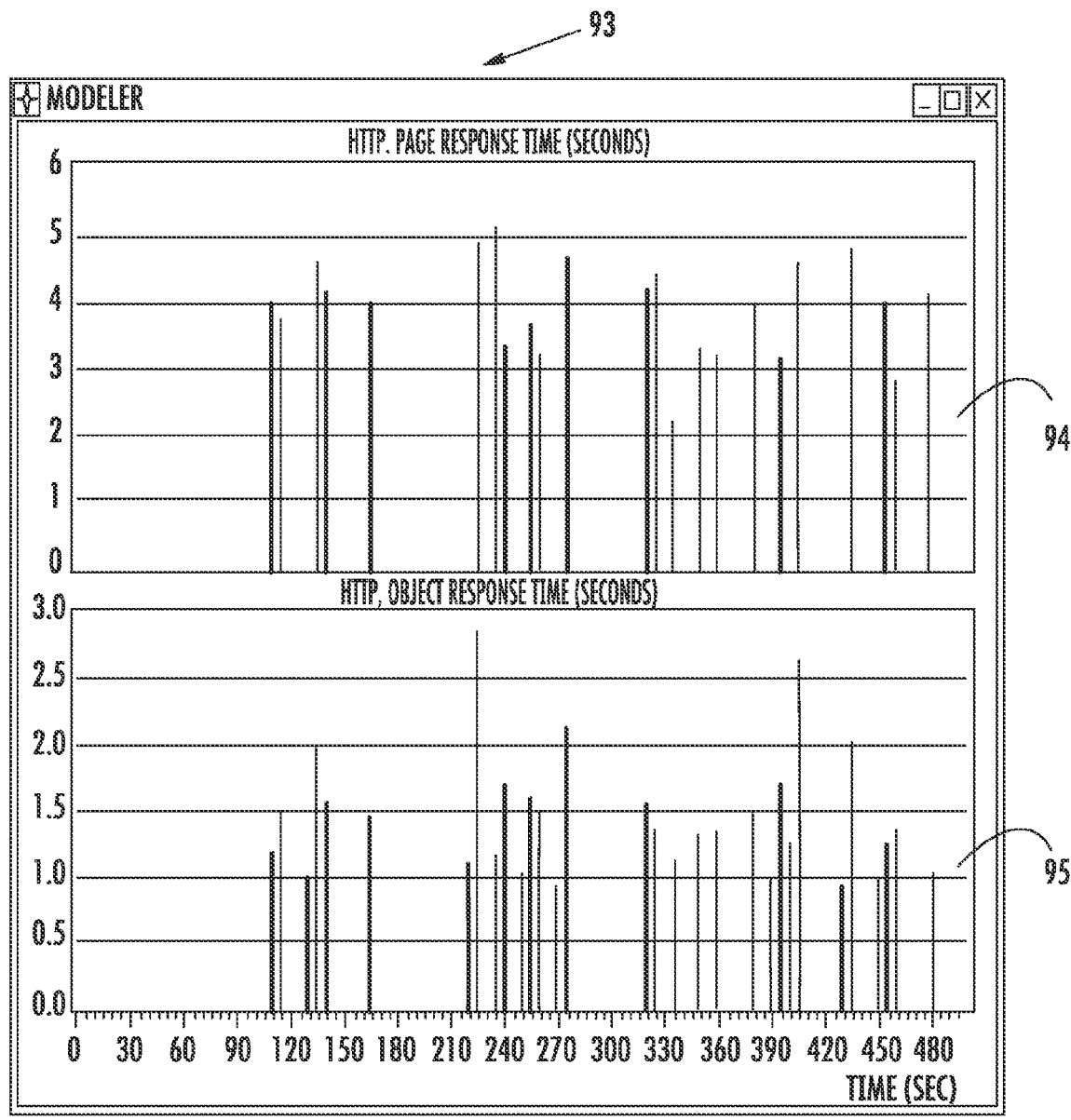
FIG. 10 is a graph of aggregate Hypertext Transfer Protocol response times for a simulation of traffic over the network shown in FIG. 5.

FIG. 9 includes a graph 87 illustrating plots for aggregate voice packet end-to-end delay 90, voice packet delay variation 91, and voice packet jitter 92 as a function of simulation run time. The end-to-end delay reached 2 seconds during the rain fade and remained close to 0.55 seconds at other times. The delay variation had a peak of close to 0.3 seconds (y-axis) at 215 seconds (x-axis) and then declined to about 0.125 seconds (y-axis) by the end of the simulation run. The jitter had a peak of about +0.0045 seconds during the rain fade. At other times, it ranged from −0.0005 to +0.002 seconds. FIG. 10 includes a graph 93 illustrating plots for aggregate Hypertext Transfer Protocol (HTTP) page response times 94 and HTTP object response times 95 as a function of simulation run time. The averages of these times were 3.907 seconds for page and 1.436 seconds for object.

Figure 11:
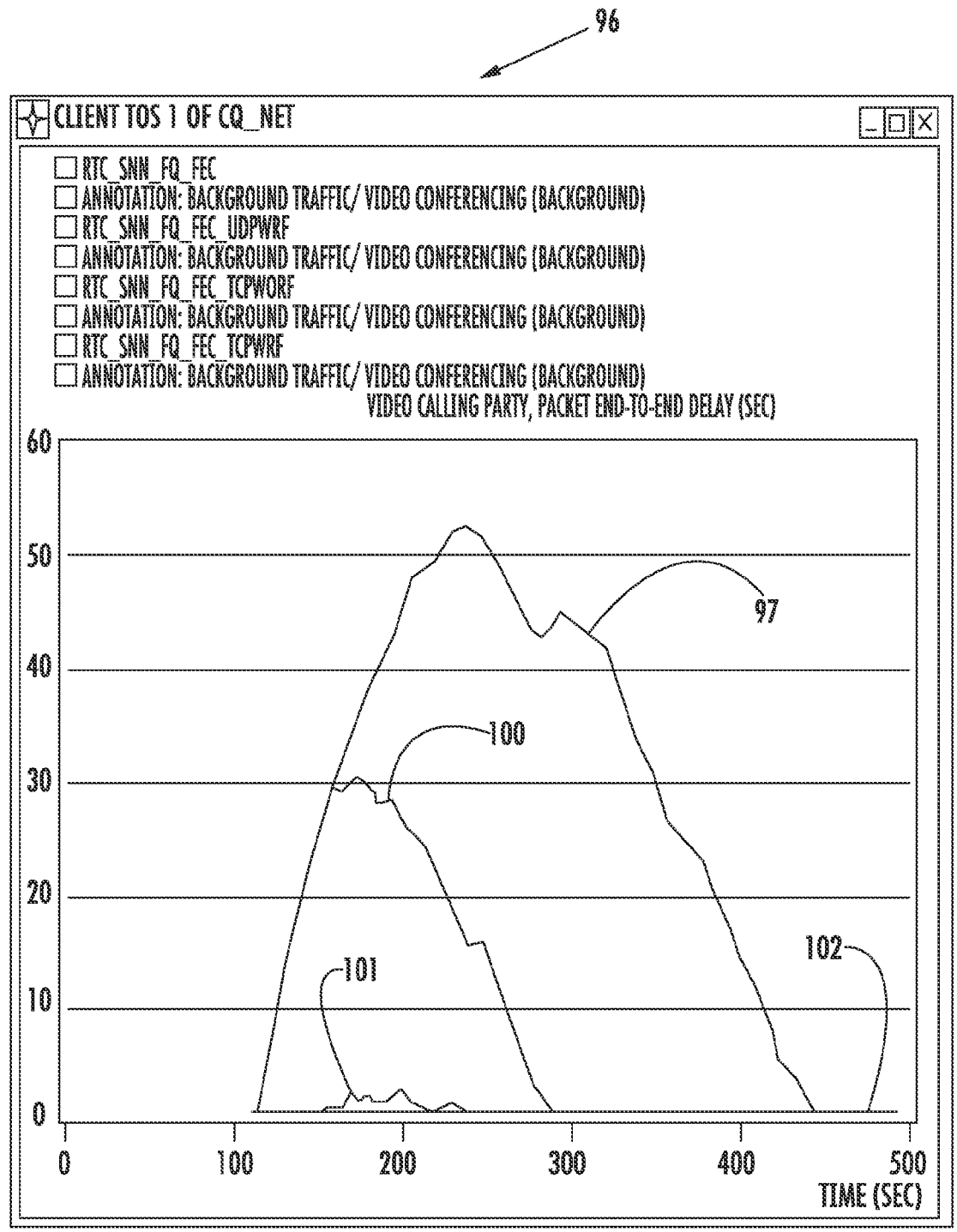
FIG. 11 is a graph of end-to-end delay for video conferencing traffic in the forward direction between server and client for a simulation of traffic over the network shown in FIG. 5.

TCP may be problematic when congestion or transmission errors occur. FIG. 11 includes a graph 96 illustrating four plots of end-to-end delay for video conferencing traffic in the forward direction between server 56a and client 57a as a function of simulation run time. The four plots are for User Datagram Protocol (UDP) transport without rain fade 102, UDP transport with rain fade 101, TCP transport without rain fade 100, and TCP transport with rain fade 97. In both TCP cases, TCP RENO SACK is used. TCP experienced a peak delay of approximately 30 seconds (y-axis) at about 175 seconds (x-axis) of simulation run time due to startup. In the TCP rain fade run, it had not recovered from the startup delay when the rain fade started. This resulted in a peak delay of approximately 53 seconds (y-axis) at 240 seconds (x-axis) of simulation time.

Figure 12:
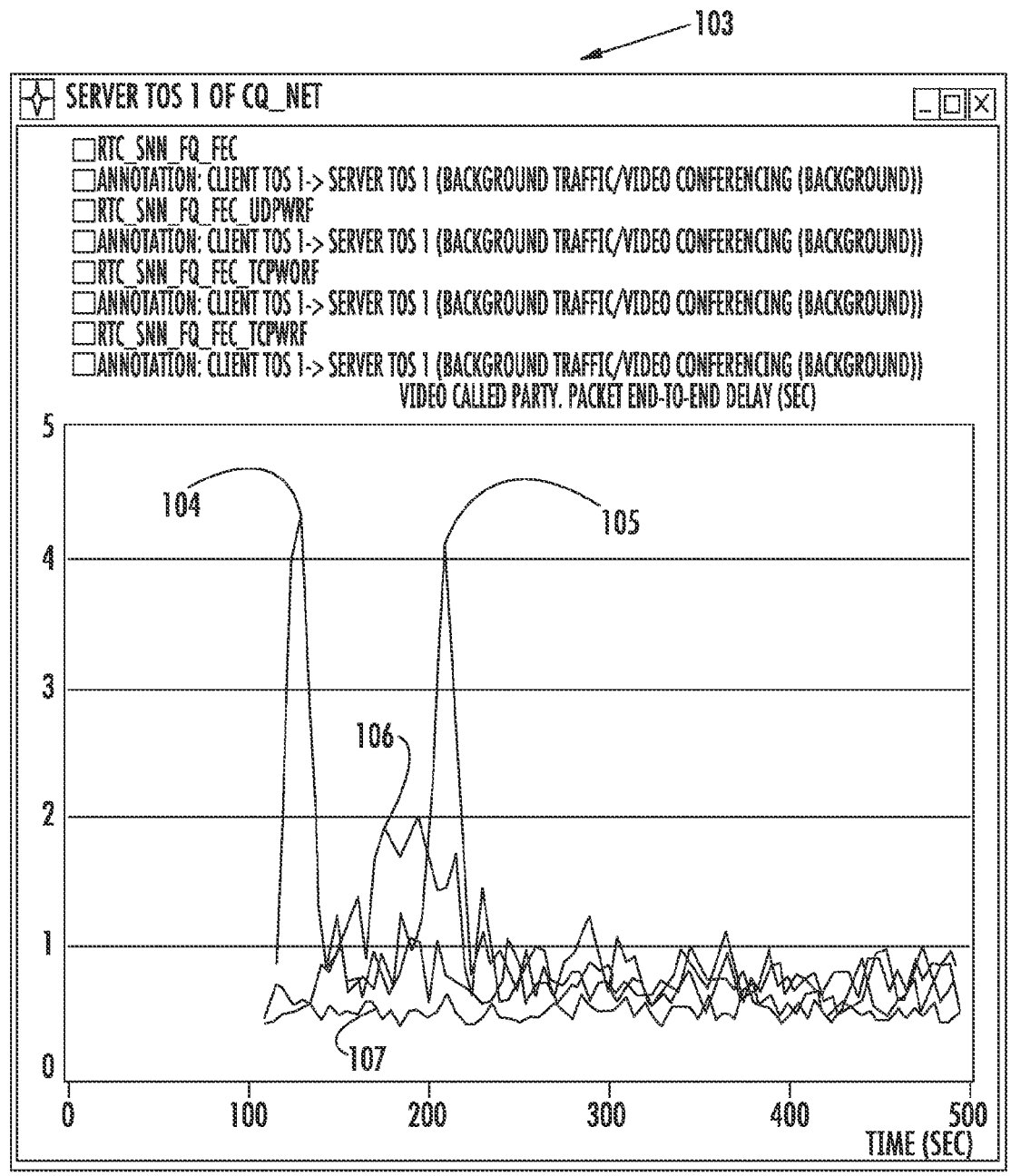
FIG. 12 is a graph of end-to-end delay for video conferencing traffic in the reverse direction between server and client for a simulation of traffic over the network shown in FIG. 5.

FIG. 12 includes a graph 103 illustrating the same four cases except for traffic being in the reverse direction, i.e., from client 57a to server 56a, where the level of traffic is only one-quarter that of the forward direction. The graph 103 includes plots for User Datagram Protocol (UDP) transport without rain fade 107, UDP transport with rain fade 106, TCP transport without rain fade 104, and TCP transport with rain fade 105. In both TCP cases, there is a peak startup delay of approximately 4.2 seconds (y-axis) occurring at about 130 seconds (x-axis) followed by recovery. In the rain fade case, a second peak of approximately 4.1 seconds (y-axis) occurs at about 210 seconds (x-axis) simulation time but again it quickly recovers. In the TCP cases, no traffic was dropped at the ground based terminal MAC class queues. TCP stopped the application from filling its input buffer, which caused the application to queue it at that level. In all these cases, all the traffic was eventually delivered.

A rain fade mitigation technique is disclosed in the DVB-S2 standard. One feature of DVB-S2 is its coding and modulation. It provides for normal (64800 bits) and short (16200 bits) FEC block lengths. Before a block of data can be transferred over the satellite link, it may arrive at the staging station and be encapsulated in a FEC code block. This results in some delay, depending on the FEC frame length, the arrival rate of the data to be encoded, and the allocated link bandwidth.

The coding and modulation of the satellite communications system 20 may be adaptively changed on a frame-by-frame basis for certain types of transport streams. The adaptation is based upon receiving signal-to-noise+interference information $Es/(N+I)$ at the sending station from the destination station(s). This feature may mitigate the effects of rain induced fading, especially for Ka and higher frequency bands.

Figure 13:
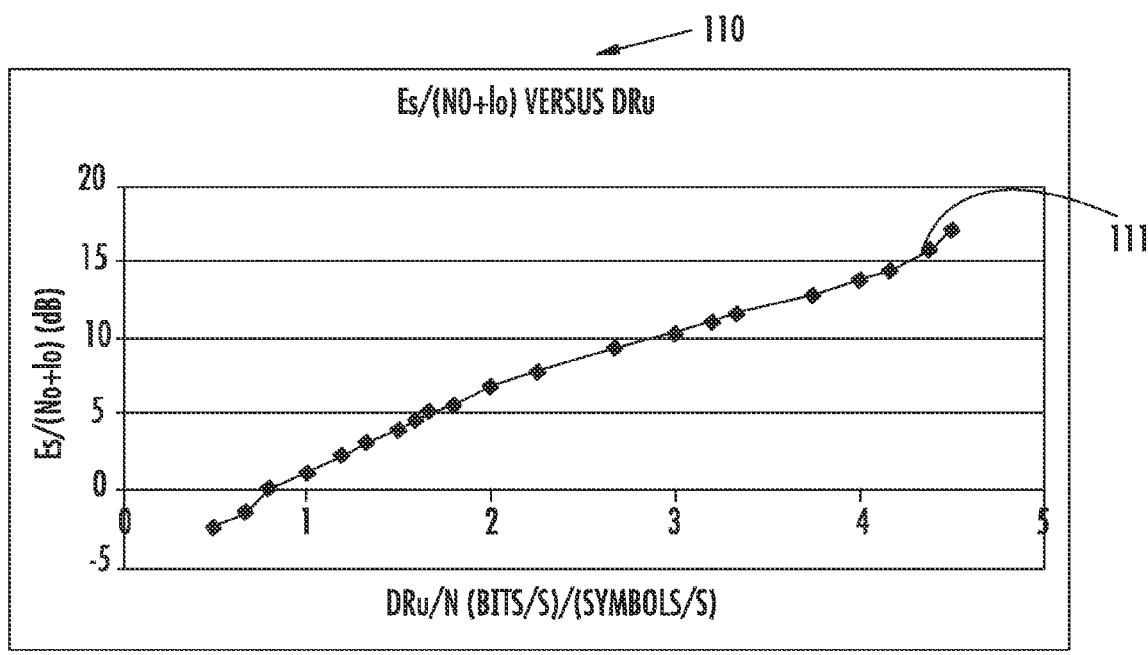
FIG. 13 is a graph of signal strength as a function of user data rate efficiency in the satellite communication system of the present invention.

The rain fade mitigation involves cross layer interaction between the physical layer at the ground based 21a-n terminals, whose received signal is affected by the rain fade, and the MAC layer in the gateway 27, which controls the coding and modulation of the forward stream of traffic directed to the affected ground based terminals. During a rain fade event, as the received $Es/(N+I)$ changes at a ground based terminal 21a-n, this is noted by the physical layer and reported to the gateway 27 MAC by sending special messages in the reverse direction. The gateway 27 MAC responds by changing the coding and modulation of the traffic stream directed to the affected ground based terminals 21a-n to maintain the ground based terminal's bit error rate at an acceptable level. This is possible because at a given $Es/(N+I)$, within a suitable range, it is known that a certain FEC code rate and modulation may result in a certain bit error rate at the ground terminals). This relationship is shown in Table 1, which is designed to give an Moving Picture Experts Group packet error rate of less than 1.0E-7. The user data rate efficiency versus $Es/(N+I)$ is shown in Table 1. FIG. 13 includes a graph 110 illustrating a plot 111 of $Es/(N+I)$ as a function of user data efficiency.

TABLE 1

Coding and Modulation

| $Es/(No + Io)$ (dB) | DRu/N (bits/s)/ (Symbols/s) | FEC_rate | Mod. |
|---|---|---|---|
| −2.5 | 0.50 | 1/4 | QPSK |
| −1.5 | 0.67 | 1/3 | QPSK |
| 0.0 | 0.80 | 2/5 | QPSK |
| 1.0 | 1.0 | 1/2 | QPSK |
| 2.2 | 1.20 | 3/5 | QPSK |
| 3.1 | 1.33 | 2/3 | QPSK |
| 4.0 | 1.50 | 3/4 | QPSK |
| 4.7 | 1.60 | 4/5 | QPSK |
| 5.2 | 1.67 | 5/6 | QPSK |
| 5.5 | 1.8 | 3/5 | 8 PSK |
| 6.6 | 2.00 | 2/3 | 8 PSK |
| 7.8 | 2.25 | 3/4 | 8 PSK |
| 9.3 | 2.67 | 2/3 | 16 APSK |
| 10.2 | 3.00 | 3/4 | 16 APSK |
| 11.0 | 3.20 | 4/5 | 16 APSK |
| 11.6 | 3.33 | 5/6 | 16 APSK |
| 12.75 | 3.75 | 3/4 | 32 APSK |
| 13.6 | 4.00 | 4/5 | 32 APSK |
| 14.4 | 4.17 | 5/6 | 32 APSK |
| 15.7 | 4.375 | 7/8 | 32 APSK |
| 17.0 | 4.50 | 9/10 | 32 APSK |

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed:

1. A satellite communications system comprising:
   a satellite;
   a first ground based satellite transceiver;
   at least one second ground based satellite transceiver;
   at least one ground based terminal coupled to said at least one second ground based satellite transceiver and configured to classify uplink data into different uplink data classifications, to determine an uplink data rate, and to determine a satellite signal path degradation; and
   a gateway coupled to said first ground based satellite transceiver and configured to communicate with said at least one ground based terminal via said satellite, and to use cross layer protocol interfacing with said at least one ground based terminal for adaptively changing at least one transmission characteristic based upon the satellite signal path degradation;
   said satellite configured to allocate bandwidth to said at least one ground based terminal based upon the uplink data classification and the uplink data rate.

2. The satellite communications system according to claim 1 wherein said at least one ground based terminal comprises a plurality thereof having different priorities; and wherein said satellite is configured to allocate bandwidth further based upon the different priorities of said plurality of ground based terminals.

3. The satellite communications system according to claim 1 wherein said gateway is configured to change the at least one transmission characteristic and said satellite is configured to allocate bandwidth further based upon a Quality of Service (QoS) of a given service.

4. The satellite communications system according to claim 1 wherein the different uplink data classifications comprise at least two of a real time class, a variable rate real time class, a variable rate jitter tolerant class, and a jitter tolerant class.

5. The satellite communications system according to claim 1 wherein the at least one transmission characteristic comprises at least one of data coding and data modulation.

6. The satellite communications system according to claim 1 wherein said gateway is configured to adaptively change the at least one transmission characteristic based upon a time period for communication from said at least one ground based terminal to said gateway.

7. The satellite communications system according to claim 1 wherein said at least one ground based terminal is configured to use a physical layer of a communications protocol for determining the satellite path signal degradation.

8. The satellite communications system according to claim 7 wherein said gateway is configured to interface with said at least one ground based terminal using a Media Access Control (MAC) layer and the physical layer of the communication protocol.

9. The satellite communications system according to claim 1 wherein said at least one ground based terminal is configured to selectively assign allocated bandwidth to the different uplink data classifications.

10. A gateway for a satellite communications system comprising a satellite; a first ground based satellite transceiver; at least one second ground based satellite transceiver; and at least one ground based terminal coupled to the at least one second ground based satellite transceiver and classifying uplink data into different uplink data classifications, determining an uplink data rate, and determining a satellite signal path degradation; the gateway to be coupled to the first ground based satellite transceiver and to communicate with the at least one ground based terminal via the satellite, the gateway comprising:
    a gateway processor configured to communicate with the at least one ground based terminal and to use cross layer protocol interfacing therewith for adaptively changing at least one transmission characteristic based upon the satellite signal path degradation in cooperation with the satellite allocating bandwidth based upon the uplink data classification and the uplink data rate.

11. The gateway according to claim 10 wherein the at least one ground based terminal comprises a plurality thereof having different priorities; and wherein the satellite is configured to allocate bandwidth further based upon the different priorities of the plurality of ground based terminals.

12. The gateway according to claim 10 wherein said gateway processor is configured to change the at least one transmission characteristic and the satellite allocates bandwidth further based upon a Quality of Service (QoS) of a given service.

13. The gateway according to claim 10 wherein the different uplink data classifications comprise at least two of a real time class, a variable rate real time class, a variable rate jitter tolerant class, and a jitter tolerant class.

14. The gateway according to claim 10 wherein the at least one transmission characteristic comprises at least one of data coding and data modulation.

15. The gateway according to claim 10 wherein said gateway processor is configured to interface with said at least one ground based terminal using a Media Access Control (MAC) layer and a physical layer of the communication protocol.

16. A method for operating a satellite communications system comprising a satellite; a first ground based satellite transceiver; at least one second ground based satellite transceiver; at least one ground based terminal coupled to the at least one second ground based satellite transceiver; and a gateway coupled to the first ground based satellite transceiver and communicating with the at least one ground based terminal via the satellite, the method comprising:
    operating the at least one ground based terminal for classifying uplink data into different uplink data classifications, determining an uplink data rate, and determining a satellite signal path degradation;
    operating the gateway using cross layer protocol interfacing with the at least one ground based terminal for adaptively changing at least one transmission characteristic based upon the satellite signal path degradation; and
    operating the satellite for allocating bandwidth based upon the uplink data classification and the uplink data rate.

17. The method according to claim 16 wherein the at least one ground based terminal comprises a plurality thereof having different priorities; and wherein operating the satellite comprises allocating bandwidth further based upon the different priorities of the plurality of ground based terminals.

18. The method according to claim 16 wherein operating the gateway comprises changing the at least one transmission characteristic further based upon a Quality of Service (QoS) of a given service; and wherein operating the satellite comprises allocating bandwidth further based upon the QoS of the given service.

19. The method according to claim 16 wherein the different uplink data classifications comprise at least two of a real time class, a variable rate real time class, a variable rate jitter tolerant class, and a jitter tolerant class.

20. The method according to claim 16 wherein the at least one transmission characteristic comprises at least one of data coding and data modulation; and wherein operating the gateway comprises adaptively changing the at least one transmission characteristic based upon a time period for communication from the at least one ground based terminal to the gateway.

21. The method according to claim 16 wherein operating the at least one ground based terminal comprises using a physical layer of a communications protocol for determining the satellite path signal degradation; and wherein operating the gateway comprises interfacing with the at least one ground based terminal using a Media Access Control (MAC) layer and the physical layer of the communication protocol.

22. The method according to claim 16 wherein operating the at least one ground based terminal comprises selectively assigning allocated bandwidth to the different uplink data classifications.

23. A gateway for a satellite communications system comprising a satellite; a first ground based satellite transceiver; at least one second ground based satellite transceiver; and at least one ground based terminal coupled to the at least one second ground based satellite transceiver and classifying uplink data into different uplink data classifications, determining an uplink data rate, and determining a satellite signal path degradation, the gateway to be coupled to the first ground based satellite transceiver and to communicate with the at least one ground based terminal via the satellite, the gateway comprising:

gateway circuitry configured to communicate with the at least one ground based terminal and to use cross layer protocol interfacing therewith for adaptively changing at least one transmission characteristic based upon the satellite signal path degradation in cooperation with the satellite allocating bandwidth based upon the uplink data classification and the uplink data rate.

24. The gateway according to claim 23 wherein the at least one ground based terminal comprises a plurality thereof having different priorities; and wherein the satellite is configured to allocate bandwidth further based upon the different priorities of the plurality of ground based terminals.

25. The gateway according to claim 23 wherein said gateway circuitry is configured to change the at least one transmission characteristic and the satellite is configured to allocate bandwidth further based upon a Quality of Service (QoS) of a given service.

* * * * *